March 2, 1948.  L. S. BURGETT  2,436,880
ELECTROMAGNETIC BRAKE MECHANISMS
Filed June 28, 1943  3 Sheets-Sheet 1

INVENTOR.
Lynn S. Burgett
BY
Harry R. Canfield
ATTORNEY

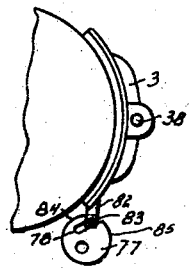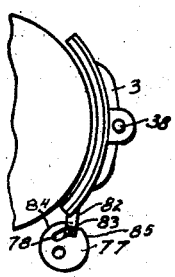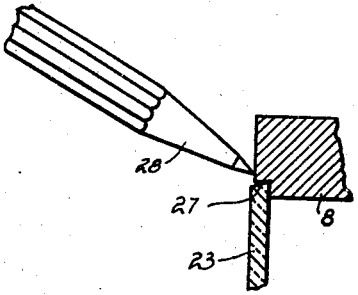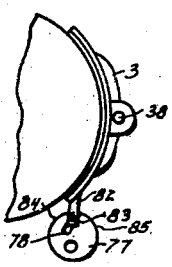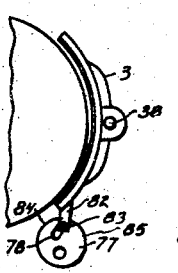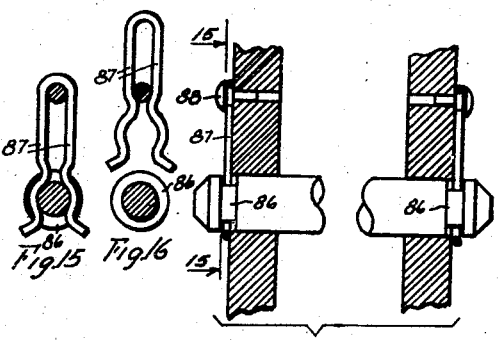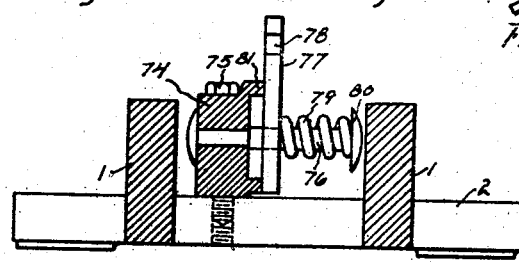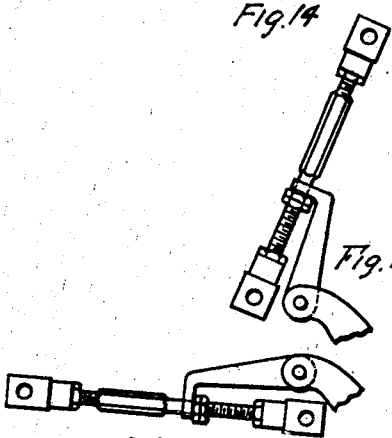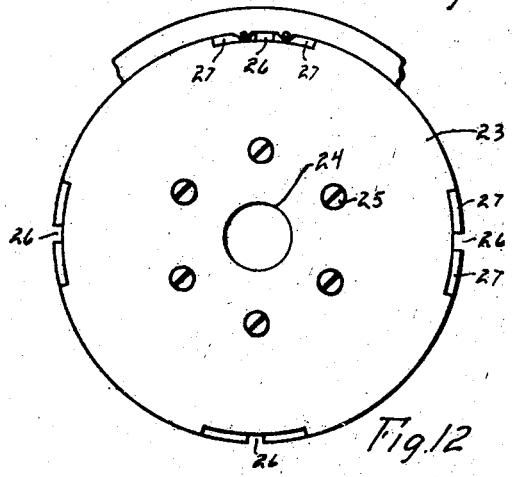

Patented Mar. 2, 1948

2,436,880

UNITED STATES PATENT OFFICE 2,436,880

ELECTROMAGNETIC BRAKE MECHANISM

Lynn S. Burgett, Euclid, Ohio, assignor to The Clark Controller Company, Cleveland, Ohio, a corporation of Ohio Application June 28, 1943, Serial No. 492,512

14 Claims. (Cl. 188—171)

1

This invention relates to brakes; and in some aspects relates to electromagnetically actuated brakes.

The invention is in that general class of brakes in which brake shoes are normally spring-biased into engagement with a brake drum, and are released therefrom by energization of an electromagnet; but as will become apparent hereinafter some of the features and principles of my invention are applicable to brakes other than electro-magnetic brakes.

There are numerous objections to prior brakes of this class and the present invention consists in improvements for overcoming these objections; and consists further in other improvements generally in brakes of this class; and some of these improvements are set forth below in the objects of the invention.

It is among the objects of the invention:

To provide generally an improved brake of the class referred to;

To provide a brake of the class referred to having improved means for adjusting it at the time of manufacture and/or in the field;

To provide in a brake of the class referred to improved adjustment means for taking up wear of the shoes and drum;

To provide in a brake of the class referred to improved means for equalizing the normal clearance between the shoes and drum;

To provide, in a brake of the class referred to, an improved construction by which the twisting or bending strains in the main frames of prior brakes are avoided;

To provide in a brake of the class referred to means by which adjustment at a single point adjusts the brake shoes to take up wear; and by which concurrent readjustment of the brake operating spring, or the operating stroke of the brake magnet, or the respective clearances of the brake shoes and drum, etc., is made unnecessary.

To provide improved means for maintaining the brake shoes respectively spaced from the brake drum when in non-braking or released positions, which means is self adjusting to render its operation uniformly effective for different degrees of wear of the shoes;

To provide an improved construction and mode of operation of a brake magnet winding retaining element;

To provide a brake of the class referred to the parts of which are readily accessible for adjustment; and which permit the drum to be removed from the brake conveniently and quickly;

To provide in a spring operable electromag-

2 netically releasable brake, means for manually locking the brake in released condition, which means is automatically rendered ineffective to lock the brake, upon energization of the electromagnet winding;

To provide a brake of the class referred to comprising improved means by which a single adjustment compensates for wear of the brake shoes and also concurrently restores other parts to their optimum original functioning relations if wear on the shoes has changed these relations.

Other objects will be apparent to those skilled in the art to which my invention appertains.

The invention is fully disclosed in the following description taken in connection with the accompanying drawing in which.

Figure 2:
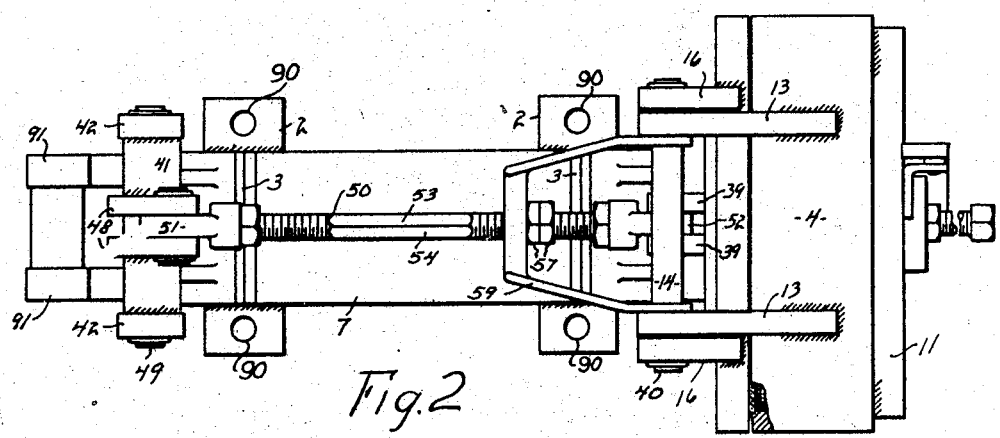
Fig. 2 is a top plan view of the embodiment of Fig. 1.
Figure 1:
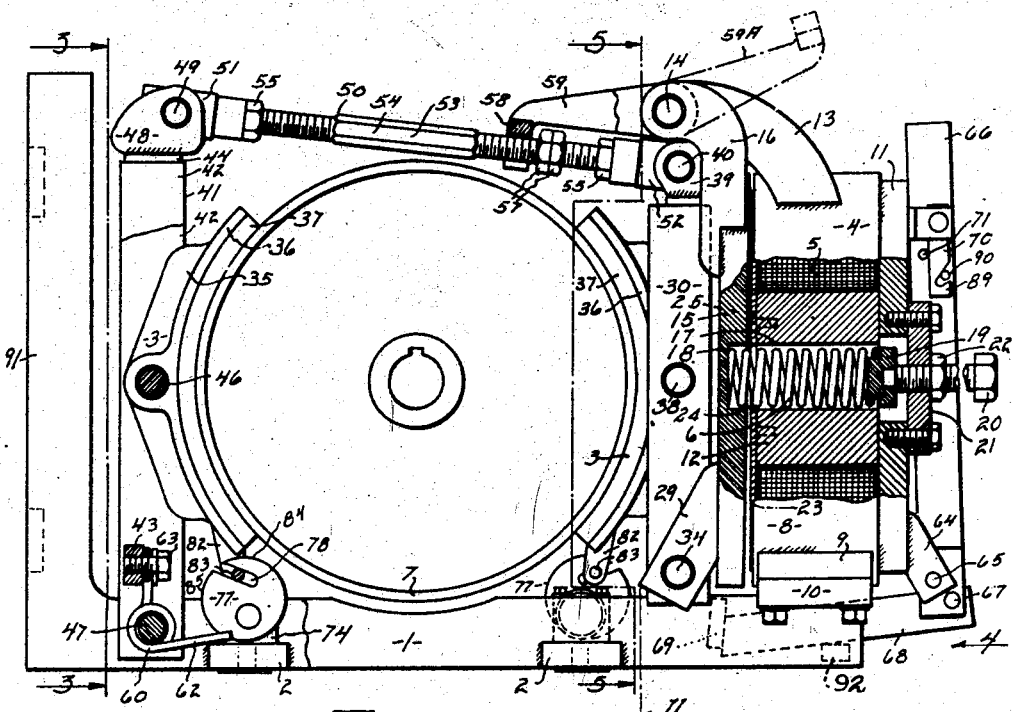
Fig. 1 is a front elevational view of a brake mechanism embodying my invention in its preferred form with parts broken away and parts in cross-sections.
Figure 4:
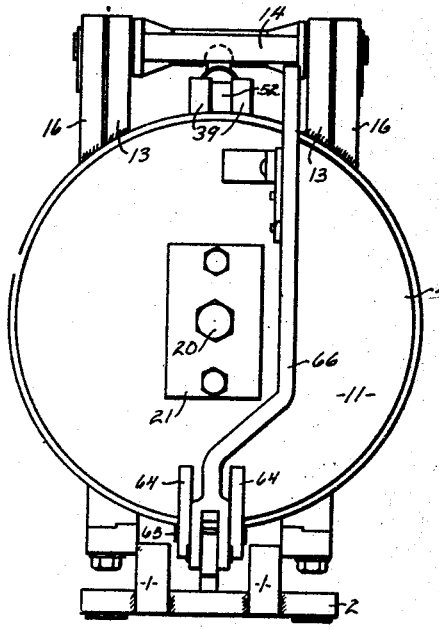
Fig. 4 is an end elevational view taken in the direction of the arrow 4 of Fig. 1.
Figure 3:
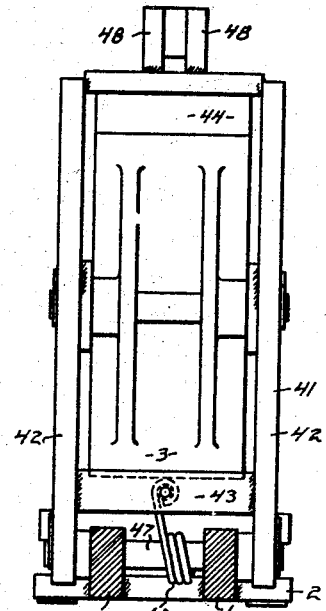
Fig. 3 is a sectional view taken from the plane 3—3 of Fig. 1 with parts behind the section plane omitted.
Figure 5:
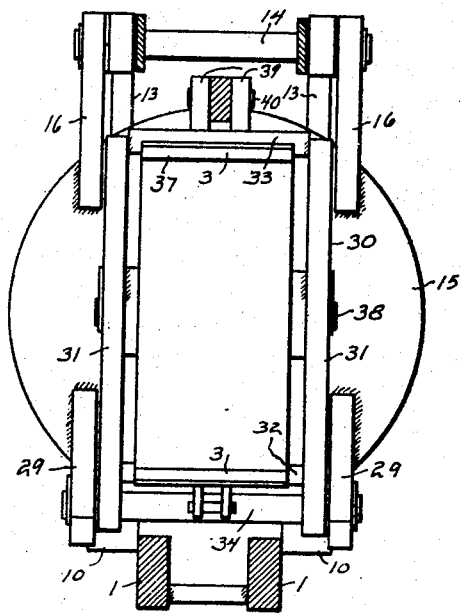
Fig. 5 is a sectional view taken from the plane 5—5 of Fig. 1 with a brake drum of that figure omitted.
Figure 6:
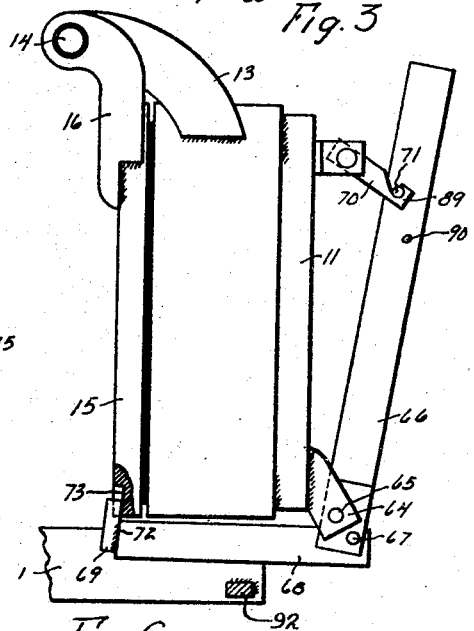
Fig. 6 is a view similar to a part of Fig. 1 but with certain operative parts thereof in different positions.

Figs. 7, 8, 9, and 10 are somewhat diagrammatic views illustrating the mode of operation of a brake shoe positioning means which is illustrated in Fig. 1;

Fig. 11 is a fragmentary sectional view taken approximately from the plane 11 of Fig. 1 and with one of the parts behind the section plane illustrated in cross-section for clearness;

Figs. 12 and 13 are views illustrating the means and method of securing a magnet winding retaining plate in a magnet shell which plate and shell are also shown in Fig. 1;

Fig. 14 is a view illustrating a means which I may employ for retaining removably pivot pins which are shown in Fig. 1 without said means;

Fig. 15 is a sectional view taken from the plane 15—15 of Fig. 14 with the parts behind the section plane omitted;

Fig. 16 is a view similar to Fig. 15 with the parts in different relative positions to show the mode of operation thereof;

Fig. 17 is a view to reduced scale of a part of

Fig. 1 illustrating a modification which I may employ;

Fig. 18 is a view of the parts of Fig. 17 in different positions which they may assume in the operations thereof.

Referring to the drawing it will be seen that the brake mechanism is of the unitary type by which it may be transported and mounted in position as a unit and to this end the parts of the mechanism are assembled upon a main frame or base. This frame or base may be variously constructed, but I prefer to provide therefor a pair of longitudinal steel base members 1—1 transversely spaced apart and rigidly connected together by a pair of longitudinally spaced apart transverse base members 2—2.

As indicated hereinbefore, the brake is of the type comprising brake shoes frictionally engaging the periphery of a brake drum, a spring to set the brake shoes into braking engagement with the drum, and an electro-magnet to disengage them; and at 3—3, I have shown the brake shoes, and at 4 I have shown generally the electro-magnet having an electro-magnetic winding 5 and at 6 the said spring; and at 7 is the brake drum. The mechanism by which the brake shoes are engaged with or disengaged from the drum will now be described.

The magnet 4 has an outer steel magnetic shell 8 to a lower portion of which feet 9—9 are welded, and these feet are bolted to brackets 10—10 on the longitudinal base members 1—1 whereby the shell is rigidly connected to the base members. To facilitate manufacture, the brackets 10—10 may be made of steel and welded to the base members, and the feet 9—9 may be secured to the brackets by bolts projected therethrough as shown.

The shell 8 is preferably made in the form of a band or hollow cylinder of steel and at one end, the right hand end as viewed in Fig. 1 is closed by an end plate 11 preferably welded thereto. A magnet core 12 is welded at one end, the right end as viewed in the drawing, to the plate 11 and the magnet winding 5 is disposed around the core 12 and within the shell 8.

By means of this construction as will be apparent, the magnet winding is completely enclosed in a steel housing except for its forward or left face as viewed in the drawing and thereby provides a well known type of electro-magnet. The left face of the winding is also covered and protected and retained in the shell by means to be described later.

Projecting upwardly and forwardly from the magnet shell 8 is a pair of armature supporting arms 13—13, transversely spaced apart and having axially aligned bores through which an armature shaft 14 is projected, and the armature supporting arms 13—13 are preferably provided by making them from steel and welding them to upper portions of the magnet shell 8. As plainly shown in Fig. 1, the shaft 14 is supported as described in a position forwardly of the magnet, the purpose of which will presently appear.

A magnet armature 15 is provided, in the form of a steel disc confronting the forward or left hand edge of the shell 8 and the left hand end of the core 12 and is mounted to swing toward and from the magnet by means of armature arms 16—16 preferably formed from steel and welded to upper portions of the armature and bending forwardly and upwardly and in their end portions being provided with bearing bores embracing the shaft 14 whereby the armature is mounted to swing on the shaft.

The magnet core 12 has a bore 17 extending co-axially therethrough and the aforesaid spring 6, preferably a helical compression spring, is disposed in this bore with one end lodged in a recess 18 in the armature 15 and with the opposite end engaging a head 19. A spring tension adjusting screw 20 is threaded into a bracket nut 21 which is bolted to the end plate 11, and the screw 20 is disposed substantially co-axial of the spring 6 and its inner end pivots upon the head 19 whereby, as will be understood, upon turning the screw the tension of the spring may be adjustably varied, and by means of a lock nut 22, locking the screw 20, the adjustment may be fixed.

The means by which the magnet winding 5 is retained within its steel housing described and covered and protected therein will now be described, reference being made to Fig. 1, Fig. 12, and Fig. 13. A brass or other non-magnetic metal disc 23 is made of such diameter that it substantially fits within the shell 8, and in its central portion is provided with a large perforation 24 through which the spring 6 passes; and the central portion of the disc 23 is secured upon the end of the core 12 by a plurality of screws 25 projected throught the disc and threaded into the end of the core. At its periphery, the disc is provided with a plurality such as four notches 26 preferably spaced or scattered around the periphery and the notches 26 are, circumferentially, wide enough to admit the end of an ordinary screw driver. At each side of the notches, the peripheral edge of the disc is bevelled as shown at 27 for a substantial distance such as an inch or more at each side of the notch.

When the disc 23 has been mounted as referred to, the central portion of the disc is secured by the screws 25 as referred to, and the periphery of the disc is also secured within the shell by a peening operation as follows.

A center punch 28 or other suitable tool is presented to the metal of the shell overhanging the bevel on the disc as shown in Fig. 13 and the metal of the shell is peened down over the bevel.

While this procedure, in connection with the construction of the parts, secures the periphery of the non-magnetic disc 23 in the shell and causes it to successfully resist the electro-dynamic action tending to force the periphery of the disc out of the shell upon energization or deenergization of the winding, the disc is not permanently secured in the shell but may be removed and again replaced if that should become necessary or desirable. To remove the disc, and after the screws 25 have been removed a screw driver is inserted in the said notches 26—26, successively, and using the screw driver as a lever, the disc is pried out of the shell, forcibly passing over the peened portions of the shell. When the disc 23 is thereafter replaced, its periphery is again secured in the shell by the repetition of the aforesaid peening operation, the metal of the shell being peened over the bevel of the disc at fresh points of the shell.

It has been found in practice that the disc 23 will have to be removed as described only a few times within the entire life of the brake so that a relatively short beveled portion on the disc to provide for a succession of peening operations will be sufficient, and for this reason bevels 27 of relatively short circumferential extent have been shown; but it will of course be understood that if preferred for any reason, the bevel can be extended all the way around the periphery of the non-magnetic disc 23.

Returning again to the brake shoe operating mechanism, it will be seen from the foregoing that when the magnet winding 5 is energized, the magnet armature 15 will be moved or swung counterclockwise; and that when the winding is de-energized the spring 6 will move the armature 15 clockwise and the mechanism causes this movement to respectively release the brake shoes from the drum or set them in braking engagement therewith. The contactor or other control means for controlling current to the winding has not been shown inasmuch as this is so well understood in this art.

Projecting downwardly and forwardly from the lower portion of the armature 15 is a pair of transversely spaced arms 29—29. Pivotally supported on these arms 29—29 is a substantially vertically extending frame shown generally at 30. This frame 30 may be variously constructed, but preferably it consists of a pair of transversely spaced uprights 31—31 spaced apart and rigidly connected by transverse tie members 32 and 33 adjacent the lower and upper extremities thereof respectively, the uprights and the tie members preferably being made from steel and welded together; and the lower end portions of the uprights 31—31 are pivoted to the said arms 29 by pins 34—34. One of the brake shoes 3 is mounted upon this frame 30. These brake shoes may be of known construction in general and the exact form and construction thereof constitutes no part of the present invention, and they therefore may comprise a brake shoe body 35 having an arcuate portion 36 and a brake shoe lining 37 concentric with the drum and engageable therewith. On a lower portion of the brake shoe body is a device cooperating with a device on the main frame, which does constitute part of the present invention and will be described later. To mount the brake shoe on the said frame 30, the body portion may conveniently be disposed between the upright 31—31 and pivotally supported thereon by a pin 38 projected through the uprights and upon which the shoe body has oscillatory bearing.

At the upper end of the said frame 30 is a pin bearing and it is preferably provided by welding a pair of upwardly extending lugs 39—39 to the upper tie member 33 and providing co-axial bores in the lugs and disposing a pivot bearing pin 40 therein.

At this point is may be noted that the four bearing pins above described and namely, 34, 38, 40, and 14 are all disposed in generally a common vertical plane and that this is intentional and introduces functions and a mode of operation and advantages which will be discussed later.

The other brake shoe 3 on the left end of the mechanism as viewed in the drawing is also mounted on a frame shown generally at 41 and this frame also preferably consists of a pair of uprights 42—42 spaced apart and connected by tie members 43 and 44 preferably formed from steel and welded together into a unit, and the brake shoe is preferably like the one on the other side of the drum and its body 35 is oscillatably mounted between the uprights 42—42 upon a pin 46 supported upon the uprights; but it will be observed that this frame 41 is pivotally connected to and supported upon the main frame by means of a pin or shaft 47 mounted on the longitudinal base members 1—1.

Upon the upper end of the frame 41 is provided a pivot bearing and it preferably consists of a pair of lugs 48—48 secured by preferably welding them to the tie member 44 and supporting a transverse pivot pin 49.

The pivot pins 40 and 49 above described are connected with each other by a linkage or tie rod of adjustable length shown generally at 50. Adjustment of the length of this tie rod 50 may be provided by various means but I prefer to make it of generally the turn-buckle type and to this end preferably I provide a tie rod head 51 having bearing on the pin 49 between the lugs 48, a tie rod head 52 having bearing on the pin 40 between the lugs 39—39, a turn-buckle bolt 53 having right hand threads on one end and left hand threads on the other threaded respectively into the heads 51 and 52, and having an intermediate portion 54 of hexagonal or other polygonal cross-section suitable to be gripped by a wrench for turning the bolt, and lock nuts 55—55 on the threads, which may be turned to lockingly engage the said heads and bolt threads to lock the bolt in adjusted rotational positions.

On the threaded end of the bolt 53, which is screwed into the head 52 are a pair of lock nuts 57—57, which may be unlocked from each other and by turning them moved along to different positions on the threaded end 56 and then locked in such position and when so locked provide an abutment on the bolt and this abutment cooperates with a removable stop shown generally at 58.

This stop is preferably stationary relative to the main frame of the structure and, for a purpose to be referred to, it is desirable that it be removable, and to this end the preferred construction is to provide as shown a U-form member 59, the legs of which are pivotally supported upon the pin 14 and the closed end of the U carrying the stop 58, the latter being in the form of a downwardly open perforation embracing the turn-buckle rod on the left hand end of the lock nuts 57—57 and engageable therewith. To remove this stop 58 for a purpose to be referred to, the entire U-form member 59 is swung upwardly clockwise around its pivot support pin 14 and may take up, for example, the position shown at 59A in broken line.

In the lower left hand corner of Fig. 1, is shown a spring 60 having a main body portion of helical form telescoped upon the shaft 47 and having free end portions 61 and 62, the end 62 lying upon any suitable abutment on the main frame, for example lying upon the adjacent transverse space member 2; and the other end 62 being formed into an eye and secured to the tie member 43 referred to above, by means of a bolt 63 projected through the eye and threaded into the tie member. This spring is formed so that it is under tension when installed as just described to exert a counterclockwise resilient torque on the frame 41 tending to rotate it in the counterclockwise direction about its lower pivot support or shaft 47.

The operation of the mechanism as thus far described will now be given, considering the parts as moving from the brake disengaged position to the engaged position illustrated in Fig. 1.

When the magnet winding 5 is de-energized to allow the brake to set, the spring 6, reacting upon the magnet armature 15, swings it clockwise around its supporting pivot 14 and thereby moves the pivot 34 at the lower end of the frame 30 toward the left as viewed in the drawing. Momentarily, the pivot 40 at the upper end of the frame 30 is held toward the left as viewed in the drawing by the spring 60 in the lower left hand corner, which as described, holds the frame 41 counterclockwise on its pivot 47 thereby holding the left hand brake shoe 3 away from the drum 1 and thereby pulling toward the left on the tie rod 50 and holding the locked nuts 57 against the stop 58 and, as stated, holding the pivot 40 toward the left.

The frame 30 therefore pivots around the pivot 40 in the clockwise direction, which moves the brake shoe pivot 38 toward the left engaging the right hand brake shoe with the drum. Continued swinging movement of the armature 15 now causes the frame 30 to be pivoted around the brake shoe pivot 38, which moves the pivot 40 toward the right as viewed in the drawing and this movement acting through the tie rod 50 rocks the frame 41 clockwise on its pivot 47 against the tension of the spring 60 and moves the left hand brake shoe into engagement with the drum; and then both brake shoes are frictionally engaged with the drum by the tension of the spring 6, the degree of the braking friction being determined by the adjustment of the tension of the spring 6 as described.

Upon energizing the winding 5 to release the brake, the reverse of these movements takes place, the spring 60 contributing to the movement of the parts to release both shoes from the drum. The adjustment provided in the mechanism above described will now be considered.

It may be stated at the outset that the pressure engagement of the two brake shoes with the drum is automatically equalized by the inherent arrangement of the parts. This may be variously described, but one way to state it is that one brake shoe after engagement with the drum functions as a fulcrum for a lever system for engaging the other brake shoe and the leverage system has a one-to-one ratio.

When the brake mechanism is first installed for operation, the brake shoe linings being new are relatively thick and the brake shoes must be positioned so that the linings will not drag upon the drum when the brake shoes are released; and after a period of use the brake shoe linings, and to some extent the drum, wear and hence it is desirable to be able to adjustably move the brake shoes toward and from the drum to provide an optimum amount of clearance therebetween at the start of use and from time to time as wear develops.

Also, it is important to be able to adjustably position the brake shoes so that the clearance between one brake shoe and the drum is the same as between the other and the drum.

In the mechanism here described, the amount of clearance of the brake shoes with the drum is determined by the length of the tie rod 50 which in turn may be varied by turning the turn-buckle bolt in one direction or the other; and the equalization of the clearance is determined by moving the lock nuts 57 along the turn-buckle thread 56 in one direction or the other.

To illustrate, if we assume that the magnet is energized to release the brake shoes, and the armature 15 is accordingly held against the magnet, this will determine a position for the pivot 34. The spring 60 will retract the left hand brake shoe until the lock nuts 57—57 have moved into engagement with the stop 58, thereby holding the left hand brake shoe away from the drum and rocking the upper end of the frame 30 counterclockwise to pull the right hand brake shoe toward the drum. The positions of the brake shoes relatively to the drum are thus determined when the lock nuts 57—57 have moved into engagement with the stop 58, and obviously, if the clearances of the brake shoes with the drum are not equal they may be equalized by moving the lock nuts one way or the other along the thread 56 of the tie rod. As will be apparent from the foregoing, when the brake is set by the spring 6, the lock-nuts 57—57 will move away from the stop 58, leaving a space therebetween, and the width of this space will become greater and greater as the brake shoe linings 37—37 wear more and more. By observing the width of this space from time to time, an attendant can keep himself informed of the state of wear of the brake shoe linings and be guided by his observation to seasonably renew the brake shoe linings.

It is believed obvious that the clearance or distance between the shoes and the brake drum, after they have been equalized will be determined by the total length of the tie rod between its pivots 40 and 49 and this can be adjustably changed by turning the tie rod in one direction or the other as described; the pitch of the right hand and left hand threads of the tie rod would, of course, be alike so that upon turning the rod to change the clearance does not change the equality of the clearance already predetermined by the adjustment of the lock nuts 57.

It has been found that when the clearance of the two shoes with the drum have once been equalized as just described, it does not change over a very long period of use, if ever in the life of the brake, and to keep the brake shoes in proper clearance relation with the drum both at the start of use when the brake is first installed and to take up for wear in use, the only adjustment necessary is that effected by turning the turn-buckle bolt 53; and this adjustment is located on the outside of the apparatus, where access to it may be freely and conveniently had.

In prior brakes, various other adjustments have been provided and have been necessary, because the readjusting of the brake shoes for wear has thrown other parts out of adjustment and they have had to be concurrently readjusted, such other readjustment including in some cases adjustment of the spring which sets the brake, adjustment of the air gap between the armature and the magnet, restoring of the equality of clearance between the respective shoes and the drum etc.

In the present brake, however, when these quantities and relations have once been established in the brake, they may change perceptibly from their original states as the brake shoes wear, but when the brake shoes are brought back to their original clearance to compensate for wear, and by the one simple adjustment above described, these other quantities are thereby restored to their original state or condition. For example, as the brake shoes wear in use, the armature 15 tends to move farther and farther away from the magnet and the spring 6 becomes more elongated and exerts a lesser braking force and because of the greater gap thus effected between the armature and the magnet the action of the magnet may become more sluggish upon releasing the brake, but all of these factors are restored to their original optimum condition, when the brake shoes are readjusted for wear and all of this is accomplished by the one simple adjustment described.

In the practical use of brakes of this class, it is desirable to be able to lock the brake in the released condition independently of the magnet or with the magnet disconnected and de-energized, for example, to overhaul or repair the brake or the apparatus which it controls, and I have provided an improved mechanism for so locking the present brake and this will now be described.

A pair of lugs 64—64 extend rearwardly and dependingly from the end plate or back plate 11 of the magnet, and may conveniently be provided by making them of steel and welding them to the plate; and in their lower end portions are provided with a pivot bearing pin 65. A lever 66 is pivoted at one end on this pin 65; and the lever itself carries a pin 67 upon which is pivoted one end of a latch or lock element 68, which extends forwardly under the magnet toward the magnet armature and preferably being disposed between the longitudinal base members 1 and 2, as shown, and on its free end carries a latch hook 69, which, as will presently appear, is adapted to hook over the lower edge of the armature 15 to lock it in the brake releasing position. In the normal use of the brake, the lock element 68 hinges downwardly around its pivot 67 and rests upon an abutment 92 with the hook 69 out of armature engaging position.

The lever 66 is normally held in the position of Fig. 1 by a latch 70 pivotally supported in any suitable manner upon an upper portion of the magnet plate 11 and having on its free end a latch hook 89 hooking under and around a pin 90 on the lever, see Fig. 1. The disposition of the pivots 65 and 67 is, as shown, such that when the lever 66 is moved clockwise the lock element 68 and hook 69 are projected forwardly.

When it is desired to operate this lock, the lever 66 is rocked counterclockwise by hand sufficiently to release the pin 90 from the latch 70. This is the position of the lever in Fig. 1; the position of the lever when latched by the latch 70 on the pin 90 is a more clockwise position than that shown in Fig. 1, although the lever 66 may stay in the position of Fig. 1 by gravity. The lever when unlatched is rocked clockwise which projects the hook 69 forwardly, and the lock element 68 carrying the hook 69 is then rocked on its pivot 67 upwardly by hand to raise the hook 69, so that it overlaps the lower end of the armature 15. The lever 66 is then rocked counterclockwise again, thereby retracting the hook 69 and causing it to engage the lower edge of the armature 15 and draw it towards the magnet into the brake releasing position and this brings a pin 71 into position where it may be engaged by the hook 89 of the latch 70, and the latch 70 is correspondingly raised to engage this pin and this holds the lever 66 in that position, holding the brake shoes released.

Correspondingly, to unlock the brake shoes, the lever 66 is rocked counterclockwise, sufficiently to permit unhooking the latch 70 from the pin 71 and then the lever 66 is rocked clockwise which projects the lock element 68 forwardly and disengages the hook 69 from the armature and the lock element 68 then hinges downwardly by gravity and the lever 66 may be restored to its original position, where it is held by the latch 70 engaging the pin 90.

After locking the armature in the brake released position by means of the hook 69 and lever 66 as described, and with the latch 70 holding the parts in locked position, considerable time may elapse while the brake or the apparatus which it controls, is being repaired or overhauled as referred to, and after this has been done and the brake is ready to be used, the mechanic in charge of the same may forget to unlatch the lock. The locking arrangement above described is rendered "foolproof" in this respect as follows: It is customary in electro-magnetic brake practice to provide an electric controller controlling the energization of the brake releasing electromagnet in connection with the apparatus controlled by the brake so that before the apparatus to be controlled can be operated the brake winding must be energized for release of the brake. Accordingly, after overhaul or repair, as referred to, the first time that the apparatus is again operated, the brake winding would be energized.

Also, as will be observed, in order to get the hook of the latch 70 over the pin 71, the lever 66 and pin 71 must be moved inwardly a short distance beyond their latching positions and then be allowed to settle back to the latching positions after the latch 70 has engaged the pin 71, so that in the locked position of the parts as described, and as will be clear, the armature 15 is not tightly engaged with the steel parts of the magnet housing, but is slightly spaced therefrom particularly at the lower edge of the armature as viewed in Fig. 1.

Therefore upon the energization of the brake winding the first time after the lock had inadvertently been left in locked condition, the armature 15 will move to take up the aforementioned small space and because of the magnetism produced by the winding the lower edge portion of the armature will be magnetized and the hook 69, which to this end of course would be made of steel, will be magnetically attached to the armature and stick to it and move with it. A small rearward movement of the lock element 68 is thereby effected which, due to the arrangement of the pivot pins 67 and 65, will rock the lever counterclockwise sufficiently to disengage the pin 71 from the latch hook 89. The latch 70 will accordingly fall by gravity and to insure that this will occur and to prevent the latch 70 from adhering magnetically to the lever 66 and pin 71 if these parts should be made from steel, the latch 70 is preferably made of non-magnetic material such as brass.

The brake is now in the condition to set when the winding is de-energized and the locking arrangement is ineffective to hold the brake shoes released, and when the magnet is de-energized to set the brake shoe, the armature 15 will be forced away from the magnet and will propel the lock element 68 along with it and this will react on the lever 66 to start it to rock clockwise whereupon it will fall clockwise by gravity and thereby propel the lock element 68 forwardly and completely detach the hook 69 from the armature 15 and the lever 66 will ultimately fall to a substantially horizontal position where it will remain until it is observed and can be hooked up again in its normal position, and the lock element 69 in the meantime will have fallen to its normal position.

When the armature 15 is locked in the brake releasing position as described, by the hook 69, and in order to prevent the hook from becoming disengaged by vibration or the like and to give it a more hook-like character, the hook 69 may be provided with an inclined face 72 and the armature may have a corresponding inclined face 73 engageable by the inclined face 72.

In the present brake construction, as in other brakes in which the brake shoes are pivoted outwardly of the brake shoe lining, in order that they may float and always conform to the contour of the drum, the shoes are apt to rotate on their pivots by gravity and cause the upper part of the brake lining to ride on the drum and wear it more than the rest of the lining, which of course, reduces the effective braking area of the lining; and this is overcome in the present brake by the following construction, comprising the devices illustrated in Fig. 1 directly under the lowermost portions of the brake shoes.

These devices are preferably alike and a description of one of them will therefore suffice. Reference may also be had to Figs. 7, 8, 9, and 10.

A bearing block 74, is mounted on the main frame, preferably upon the transverse brace member 2 by bolts or the like 75 and a pivot pin 76 is mounted thereon extending laterally therefrom and on the pin is mounted for oscillatory movement a disc 77 having a notch 78 in its periphery extending at an angle to the radius of the disc and the bearing of the disc on the pin is preferably below its center. A spring 79 surrounding the pin reacts upon the disc and upon an enlarged pin head 80 and holds the disc in frictional engagement with the block; and to equalize wear effected upon oscillatory movement of the disc, the frictional engagement of the disc and block is caused to occur on an annular surface 81 provided on the block.

A finger construction 82 on the lower end of the brake shoe carries a pin 83 lying transversely in the slot 78.

In the operation of this device, when the brake shoe is retracted to release the brake, the brake shoe pivot pin, for example the pin 38, moves radially away from the drum. If the shoe should tend to rotate by gravity around the pin 38, as referred to, the pin 83 prevents it by its engagement with the side of the slot 78. This action is shown diagrammatically in Figs. 7 and 8 in going from Fig. 7 to Fig. 8. In these two figures and in Fig. 1, the slot 78 is shown in the position, which it would assume when the brake is new and the brake shoe linings are thick.

If the disc 77 were rigidly mounted on the frame, then as the brake shoe linings wear, the engagement of the pin 83 with the edges of the slot 78 would interfere with the free floating of the brake shoe and it is for this reason that the disc is made frictionally movable. Because of this frictional yielding support for the disc, each time that the brake shoe is moved to its braking position, the pin 83 by engagement with the other side of the slot 78 gradually rotates the disc around its frictional pivot and after the brake linings have worn a great deal, the disc and the disc slot will be in positions indicated diagrammatically in Figs. 9 and 10 where in going from Fig. 9 to Fig. 10 the above described actions will be seen to occur. The device thus not only prevents the gravitational fall or drooping of the brake shoes when in their released condition, but automatically compensates and adjusts itself for wear of the brake shoes so that it operates with equal effectiveness for all thicknesses of brake shoe linings.

It is not essential that the disc 77 be circular as shown; in fact it is not essential that it be in any sense a disc. A disc has been shown because this is the most convenient form or shape to manufacture and because it is the most convenient way to provide surfaces 84 and 85 at the sides of the slot 78 for the following purpose. When assembling the brake shoe on its own pivot pin, the pin 83 should first be placed in the slot 78, otherwise, for the optimum shape and direction of the slot 78, it might be impossible to position the pin 83 in its slot. By providing the said surfaces 84 and 85, the engagement of the pin with these surfaces will make it impossible to insert the brake shoe pivot pin. These surfaces therefore compel the assembler to first put the pin 83 in its slot 78 before inserting the brake shoe pivot pin so that both pins are sure to be properly assembled with their coordinate parts. It is believed therefore that it will now be apparent that the surfaces 84 and 85 are not essential; but that when they are provided they compel a proper assembly of the parts the first time; thereby avoiding trial and error; and that when these surfaces are provided they may be provided by any suitable configuration of the material in which the slot 78 is provided.

In the foregoing description, the various pins, such for example as the pins 34, 38, 40, 14, 49, 46, and 47 are described as having implied means to hold them from moving longitudinally out of the structure; and as is well known it is preferred to mount them loosely in their bores so that they can upon occasion be removed. It is preferred in the present structure that such pins be removable but the means for rendering them removable has been omitted from the principal figures of the drawing in the interest of simplicity and the preferred means is shown separately in Figs. 14 to 16 inclusive.

The pins project longitudinally beyond the parts which they connect and are provided with circular grooves 86 in the pin near their ends; and a spring wire bent generally in the form of a hair pin is formed to grip the pin in the groove so that the spring wire, which may be referred to as a cotter, prevents endwise shifting of the pin, although the grooves are so located as to allow some clearance between the cotter and the part adjacent to it. It is understood that such hair pin cotters are old but an improvement has been made here which overcomes one of the objections to such cotters. In practice it has been found that when the cotters are removed they are laid aside and by the time that they are wanted again for replacement, they become lost or damaged; and the improvement here disclosed, while permitting movement of the cotter to disengage it from its pin, which it is intended to retain, is prevented from removal from the apparatus. This is accomplished by providing the cotter with sides 87—87 which converge toward each other and by mounting the closed end of the hair pin cotter on a headed pin 88 driven or threaded into the apparatus at a convenient point near to the main pin. When the cotter is withdrawn from the groove of the main pin to release the latter, the converging sides 87 of the cotter grip the supplemental pin 88 thus resiliently mounting the cotter on the apparatus near its point of use.

In brakes of this general class, it is desirable to be able to remove the drum out of the brake in the direction radial to the drum with the least possible disturbance or disassembly of the brake parts and this advantage is provided for in the present brake as follows.

Referring for example to Fig. 1, the U-shaped member 59 may as was described be rotated around into the broken line position 59A. One of the pins 40 or 49 preferably the pin 40, may then be removed as described and the tie bar rocked out of the way around the remaining one of these pins. After this simple operation, the drum 7 may be raised vertically out of the brake structure during which the brake shoes will rock on their own pivots out of the way of the drum.

In Figs. 17 and 18 is illustrated a modification of the support for the stop 58. Here this stop, designated as 58A, completely encircles the tie rod instead of being in the nature of a slotted stop embracing only the upper half of the tie rod. The functions of this stop are the same as those of the stop 58 described hereinbefore. In this case, however, to remove the stop support and the tie rod to permit removal of the drum, both pins 40 and 49 would be removed; and then the U-shaped member 59 with its stop 58 and the tie rod itself would all be revolved out of the way around the pivot pin 14, as shown in going from Fig. 17 to Fig. 18.

In brakes of this general class, stresses are set up during operation of the mechanism to set the brake; and stresses are set up by the torque developed in the mechanism by the rotatory drum while being brought to rest and being held at rest by the brake shoes.

These stresses are transmitted to the frame which supports the mechanism; and to resist them and thereby hold the parts in their intended relative positions for correct functioning, the frame must be rigid. In prior brakes, where this necessary rigidity is provided it is usually built into the frame itself by making the frame sufficiently strong, without regard to the directions in which the stresses are developed; and in consequence the frames have been unduly bulky, heavy, and expensive.

It is one of the advantages of the present brake that the aforesaid stresses act upon the frame with very little or no bending moment, whereby a light weight, simple frame is rendered sufficiently strong to counteract them.

As to the stresses on the frame occasioned by operation of the mechanism, these strains result from the forces holding the brake shoes against the drum. As to the left hand brake shoe, as viewed in the drawing, this force is developed in the frame 41 acting as a lever, pivoting on the shoe pivot 46, and is transmitted to the base members 1—1 of the main frame at the pin or shaft 47, and its direction is longitudinal of these base members and there is no bending moment at all.

As to the right hand shoe, this force is developed in the frame 30 as a lever, rocking on the shoe pivot 38, and is applied to the lever at its lower end at the pin 34 by the magnet spring; and the line of action of the force is horizontal and substantially parallel with the main frame base members 1—1. This force reacts horizontally on the pin 34 and on the magnet frame at its point of attachment to the base members 1—1 and is therefore so near to the base members that the bending moment of the force with respect to the base members is so small as to be negligible. In the development of this brake, the parts were originally so arranged that this line of force reaction was located between the base members 1—1 so that the bending moment on the base members was zero; but it was found to be more convenient to arrange the parts with this line of force reaction slightly above them and it has been placed there in the final design, because the moment produced thereby is so small as to be negligible.

As to the stresses on the frame occasioned by the torque of the rotary drum transmitted to the frame by the shoes gripping the drum, these stresses are tangential to the drum and tend to cause the frame and the brake mechanism as a whole to rotate with the drum. The frame is bolted to a floor, beam or the like by bolts projected through perforations 90—90 in the transverse base members 2—2 upon which the frame is supported.

Considering first the left hand shoe, whether the drum rotates in one direction or the other, tangential force is transmitted through the frame 41 to the pin or shaft 47 and thence to the frame in vertical directions, and the horizontal distance from this pin to the adjacent transverse base member is so small (and in fact could readily be made zero) that bending moment on the main frame is negligible.

Considering the right hand shoe, in either direction of rotation of the drum, vertical tangential force is transmitted to the frame 30 through the shoe pin 38, and thence vertically to the pin 34, and thence vertically through the armature to the pin 14, and thence through the short rigid arms 13—13 to the magnet frame, and thence vertically to the base members 1—1, so that the bending moment in the main frame is represented by the moment arm distance from the middle of the magnet supporting bracket 10 to the adjacent transverse base member 2; and this distance can be made smaller and smaller by positioning the said base member 2 nearer and nearer to a point directly under the magnet. The location of this base member 2 as shown in the drawing has been found to reduce the bending moment in the main frame to a negligible quantity.

At the left hand end of Fig. 1, I have shown the base members 1—1 as continuing into feet 91 at right angles to the direction of the members 1—1; and this has been done to illustrate that the brake mechanism can be mounted either horizontally (as viewed in Fig. 1) or vertically as it would be if it were supported by these feet 91 on a horizontal support.

The brake mechanism of this invention will operate equally well in the horizontal or vertical position as referred to; and when in the vertical position, the spring 60 may in some cases not be needed, gravity, in such cases performing its function.

When the brake is to be built for horizontal use only, the feet 91 would be omitted, by omitting that part thereof to the left of the section line 3—3 in Fig. 1.

My invention is not limited to the exact details of construction, proportions and relation of parts, illustrated and described. Changes and modifications may be made, and my invention comprehends all such modifications and changes which come within the scope of the appended claims.

I claim:

1. In a locking mechanism for an electromagnet, comprising a magnet and an energizing winding therefor and a spring-movable magnetically-retractable armature; an armature latch having a magnetic armature-engageable latch portion and biased to move from an armature engaging to an armature disengaging position; a pivoted lever connected to the latch and movable in two directions, to correspondingly propel and retract the latch; a lever latch engageable with the lever to hold it in one direction and biased to tend to move to lever disengaging position; the armature latch when in armature engaging position being retractable by the lever upon movement thereof in said one direction to retract the armature through a portion only of its stroke; and the lever latch being operable to hold the lever in that position; the armature being retractable through the rest of its stroke upon energization of the winding and magnetically adhering to and retracting the armature latch; and the lever being thereby movable to effect disengagement of the lever latch by its bias; the armature upon being spring-moved upon subsequent de-energization of the winding, propelling the latch and causing movement of the unlatched lever in the direction to further propel the armature latch out of armature engagement.

2. In an electromagnetic brake comprising spring-set brake shoes retractable by the armature of an electro-magnet upon energization thereof; operator-operable means to lock the armature in retracted position comprising: an armature-engageable latch; a lever to move the latch to retract the armature; a lever latch to hold the lever with the armature retracted through only a part of its total stroke, and biased to tend to move to lever unlatching position; and the armature latch comprising a magnetic portion which adheres to the armature upon energization of the electro-magnet and effects movement of the armature latch and lever and unlatching of the lever, upon energization of the electromagnet and the consequent movement of the armature through the remainder of its stroke.

3. In a magnetic brake construction, a main base disposable under a brake drum; a first mechanism frame member pivoted at a lower portion to the base, extending upwardly therefrom, pivotally supporting a first brake shoe at an intermediate portion, and supporting a first tie rod bearing at an upper portion; an electromagnet comprising a magnet frame supported at a lower portion thereof on the base, and at an upper portion supporting an armature bearing; a swinging armature depending from the armature bearing; a second mechanism frame member pivotally connected at a lower portion to a lower portion of the armature, and pivotally supporting a second brake shoe at an intermediate portion, and at an upper portion supporting a second tie rod bearing; the brake shoes being disposed at opposite sides of the drum, and the tie rod bearings being spaced apart; a tie rod construction connecting the tie rod bearings and comprising means to adjust its length; abutment means carried by the tie rod and movable adjustably along the tie rod; and stop means engageable by the abutment means.

4. The construction described in claim 3 and in which the said first mechanism frame member is biased in the direction to disengage its associated shoe from the drum and to effect engagement of the abutment with the stop means.

5. The construction described in claim 3 and in which the swinging armature is disposed between the electromagnet and the said second mechanism frame member; and the said second tie member bearing, the said second shoe bearing, and the said pivot connection to the armature are all three in substantially a common plane.

6. The construction described in claim 3 and in which the said stop is disposed above the drum and is hingingly movable away from the abutment and disposable out of the path of the drum when the latter is moved upwardly out of the construction.

7. The construction described in claim 3 and in which the tie rod lies above the drum and is detachably supported in the tie rod bearings whereby it may be removed out of the path of the drum when the latter is moved upwardly out of the construction.

8. The construction described in claim 3 and in which the base is provided with mounting means disposed to support the construction with the base at a side of the drum.

9. In a magnetic brake construction, a main base; a first mechanism frame member pivoted at a lower portion to the base, extending upwardly therefrom, pivotally supporting a first brake shoe at an intermediate portion, and supporting a first tie rod bearing at an upper portion; an electromagnet comprising a magnet frame supported on the base, an armature bearing supported adjacent to an upper portion of the magnet frame; a swinging magnet armature depending from the armature bearing; a second mechanism frame member pivotally connected at a lower portion to a lower portion of the armature, and pivotally supporting a second brake shoe at an intermediate portion, and at an upper portion supporting a second tie rod bearing; the brake shoes being disposed in confronting spaced relation, and the tie rod bearings being spaced apart; a tie rod construction connecting the tie rod bearings and comprising means to adjust its length; abutment means on and movable with the tie rod and movable adjustably along the tie rod; and stop means engageable by the abutment means.

10. In a magnetic brake construction, for cooperation with a rotary brake drum, a main base; a first mechanism frame member pivoted at a lower portion to the base, extending upwardly therefrom, pivotally supporting a first brake shoe at an intermediate portion, and supporting a first tie rod bearing at an upper portion; an electromagnet comprising a magnet frame supported on the base, an armature bearing supported adjacent to an upper portion of the magnet frame; a swinging magnet armature depending from the armature bearing and electromagnetically attractable toward the magnet frame, and a spring to retract it; a second mechanism frame member pivotally connected at a lower portion to a lower portion of the armature, and pivotally supporting a second brake shoe at an intermediate portion, and at an upper portion supporting a second tie rod bearing; the brake shoes being disposable at opposite sides of the drum, and being provided with renewable linings for engaging the drum, and the tie rod bearings being spaced apart; a tie rod construction connecting the tie rod bearings and comprising means to adjust its length; abutment means on and movable with the tie rod and movable adjustably along the tie rod; and stop means engageable by the abutment means, when the brake shoes are retracted from the drum upon energization of the electromagnet, and movable away from the abutment when the brake shoes are moved by the spring to engage the drum upon de-energization of the electromagnet; the extent of movement of the stop means away from the abutment being inversely commensurable with the worn thickness of the brake shoe linings.

11. In a brake of the type comprising brake shoes disposable on opposite sides of a brake drum and movable toward the drum to engage it to set the brake and movable away from the drum to clear it to release the brake; a frame; supports for the shoes; means interconnecting the shoe supports; mutually engageable stop elements, one on the interconnecting means and one supported by the frame; engaged when the brake is released and spaced apart when the brake is set; the spaced distance of the separated stop elements being proportional to the clearance between the brake shoes and the drum when the brake is released and increasing as the brake shoes wear; the said stop elements being disposed so that the said spaced distance is readily observable and indicates at all times the shoe-and-drum clearance and the state of wear of the shoes; and means to adjust the length of the interconnecting means effective to adjust the shoe-and-drum clearance to take up for wear.

12. In a brake of the type comprising brake shoes disposable on opposite sides of a brake drum and movable toward the drum to engage it to set the brake and movable away from the drum to clear it to release the brake; a frame; supports for the shoes; a tie rod interconnecting the shoe supports; mutually engageable stop elements, one on the tie rod and one supported by the frame, engaged when the brake is released and spaced apart when the brake is set; the spaced distance of the separated stop elements being proportional to the clearance between the brake shoes and the drum when the brake is released, and increasing as the brake shoes wear; the said stop elements being disposed so that their positions relative to each other are readily observable and indicate at all times the shoe-and-drum clearance and the state of wear of the shoes; and means to adjust the length of the tie rod effective to adjust the shoe-and-drum clearance to take up for wear.

13. In combination with the spring-movable magnetically-retractable armature of an electromagnet, and a frame supporting the magnet and armature: a lock element supported for movement manually in one direction to an operative position and biased for movement in the opposite direction to an idle position, and reciprocable in both positions; a lever movable to reciprocate the lock element; the lock element in the operative position being out of engagement with the armature, and being reciprocable by the lever in one direction to engage the armature and retract it against the force of the spring; and the lock element when reciprocated in the idle position by the lever moving idly without engaging the armature; anad a latch for holding the lever and lock element in armature retracted position.

14. In combination with the spring-movable magnetically-retractable magnetic armature of an electromagnet, and a frame supporting the magnet and armature: a movable lock element; a pivotally supported lever, movable in alternate directions to move the lock element forwardly and to retract it; the lock element being movable manually to a position in which, when retracted by movement of the lever, a portion of the lock element moves into engagement with the armature and retracts it against the force of the spring through a portion of the armature's retractable movement; and the lock element being biased to a normal position in which when retracted by the lever the said portion thereof moves without engaging the armature; a movable latch for holding the lever and lock element in said armature-retracted position and biased toward a released position; the said portion of the lock element being magnetic and being caused to adhere to the armature magnetically to cause the lock element to move with the armature when the latter is moved through the rest of its magnetically-retractable movement by the magnet; and the lock element thereupon moving the lever to effect release of the lever holding latch.

LYNN S. BURGETT.

REFERENCES CITED

The following references are of record in the file of this patent:

UNITED STATES PATENTS

| Number | Name | Date |
|---|---|---|
| 1,154,791 | Marr | Sept. 28, 1915 |
| 1,358,339 | Schakel | Nov. 9, 1920 |
| 1,686,006 | Jablow | Oct. 2, 1928 |
| 2,059,244 | Kiekhaefer | Nov. 3, 1936 |
| 750,283 | Hoover et al. | Jan. 26, 1904 |
| 1,967,478 | Pflager | July 24, 1934 |
| 2,087,478 | Hodgson | July 20, 1937 |
| 2,087,895 | Bierenfeld | July 27, 1937 |
| 1,199,872 | Burton | Oct. 3, 1916 |
| 1,295,367 | Peycke | Feb. 25, 1919 |
| 2,130,595 | Mueller | Sept. 20, 1938 |
| 1,672,314 | Hall | June 5, 1928 |
| 1,852,857 | Price | Apr. 5, 1932 |
| 2,314,451 | Lillquist | Mar. 23, 1943 |